(12) United States Patent
Benoit et al.

(10) Patent No.: US 7,840,814 B2
(45) Date of Patent: Nov. 23, 2010

(54) METHOD FOR MANAGING AN EXECUTABLE CODE DOWNLOADED IN A REPROGRAMMABLE ON-BOARD SYSTEM

(75) Inventors: Alexandre Benoit, Aubagne (FR); Ludovic Rousseau, Aubagne (FR)

(73) Assignee: Gemalto SA, Meudon (FR)

( * ) Notice: Subject to any disclaimer, the term of this patent is extended or adjusted under 35 U.S.C. 154(b) by 994 days.

(21) Appl. No.: 10/553,348
(22) PCT Filed: Apr. 2, 2004
(86) PCT No.: PCT/EP2004/050437
§ 371 (c)(1), (2), (4) Date: Jun. 14, 2006
(87) PCT Pub. No.: WO2004/090718
PCT Pub. Date: Oct. 21, 2004

(65) Prior Publication Data
US 2007/0043957 A1     Feb. 22, 2007

(30) Foreign Application Priority Data
Apr. 14, 2003   (FR) ................................... 03 04628

(51) Int. Cl.
    H04L 9/32      (2006.01)
    H04L 9/00      (2006.01)
    G06F 11/30     (2006.01)
    G06F 15/16     (2006.01)
    H04M 3/16      (2006.01)
    G06F 9/45      (2006.01)
    G06F 15/76     (2006.01)
    G07F 7/10      (2006.01)
    G07F 7/12      (2006.01)
    G06K 19/06     (2006.01)

(52) U.S. Cl. ..................... 713/176; 713/181; 713/193; 455/410; 709/203; 380/25

(58) Field of Classification Search ................. 713/176
    See application file for complete search history.

(56) References Cited

U.S. PATENT DOCUMENTS 6,005,942 A    12/1999   Chan et al.

2002/0002703 A1    1/2002   Baentsch et al.
2005/0107069 A1*   5/2005   Vetillard ..................... 455/410

FOREIGN PATENT DOCUMENTS

FR       2 797 963          3/2001
WO       WO 0028416 A1 *    5/2000

OTHER PUBLICATIONS

You-Sung Chang, Seungjong Lee, In-Cheol Park, Chong-Min Kyung, "Verification of a microprocessor using real world applications", Jun. 1999, DAC '99: Proceedings of the 36th annual ACM/IEEE Design Automation Conference, Publisher: ACM, pp. 181-184.*
Sun Microsystems: "Java Card 2.1 Virtual Machine Specification", Jun. 7, 1999, pp. 1-46.
X. Leroy, "On-Card Byecode Verification for Java Card", Lecture notes in Computer Science, New York, vol. 2140, 2001, pp. 150-164.
L. Casset. "Formal Development of an Embedded Verifier for Java Card Byte Code", Washington, D.C., 2002, pp. 51-56.

* cited by examiner

*Primary Examiner*—Michael Pyzocha
*Assistant Examiner*—Courtney D Fields
(74) *Attorney, Agent, or Firm*—Buchanan, Ingersoll & Rooney PC

(57) ABSTRACT

A method for managing an original executable code downloaded into a reprogrammable computer on-board system such as a microprocessor card. The code includes a cryptographic signature and is executable by the microprocessor once the validity of the signature has been checked. Off the card, a modified executable code corresponding to the original code and adapted to a pre-defined specific use is identified. A software component is calculated, which when applied to the original code, enables the modified code to be reconstructed. The software component is signed, and the signed original code and the signed software component are downloaded into the card. On the card, the signature of the original code and the software component are checked, and the software component is applied to the original code in order to reconstruct the modified code for the execution of the same by the microprocessor.

6 Claims, 1 Drawing Sheet

OFF CARD

METHOD FOR MANAGING AN EXECUTABLE CODE DOWNLOADED IN A REPROGRAMMABLE ON-BOARD SYSTEM

This disclosure is based upon French Application No. 0304628, filed Apr. 14, 2003 and International Application No. PCT/FR2004/050437, filed Apr. 2, 2004, the contents of which are incorporated herein by reference.

BACKGROUND OF THE INVENTION

The invention concerns a method of managing an executable code designed to be downloaded, in particular into an on-board microprocessor computer system.

SUMMARY OF THE INVENTION

In general terms, the present invention applies to any on-board system, reprogrammable by downloading a program consisting of an executable code, in the form of a series of instructions executable by the microprocessor of the on-board system. The invention finds a particularly advantageous application in a context where the executable code consists of an intermediate object code, executable by the microprocessor of the on-board system by means of an interpreter for the intermediate code, commonly referred to as a virtual machine, provided with an execution stack and registers of operands manipulated by these instructions and making it possible to interpret this intermediate code.

More particularly, the description that follows concerns the application of the invention in the context of reprogrammable microprocessor cards of the JavaCard type.

The microprocessor cards of the JavaCard type are in fact reprogrammable by means of an operation of downloading a small program, referred to as an "applet" in English terminology.

For reasons of portability between different on-board computer systems, an applet is in the form of a code for a standard virtual machine. This code, written in binary form, serves as an intermediary between the source code and the executable binary code and is obtained for example by using a Java compiler. This intermediate code, "bytecode" according to the English terminology, is therefore not directly executable by the microprocessor of the card but must be interpreted in a software fashion by a binary code interpreter called a virtual machine. It suffices for the card in which the applet written in intermediate language is to be executed to be provided with a minimum of specific data processing resources forming the program constituting the virtual machine. In the aforementioned example of cards of the JavaCard type, the virtual machine used is a sub-assembly of the Java virtual machine.

The operation of downloading applets onto an on-board computer system provided with an intermediate-code interpreter poses a certain number of security problems. Thus an applet that is unintentionally badly written may incorrectly modify data already present on the system, prevent the main program from being executed correctly, or modify other applets previously downloaded, by making them unusable or harmful.

Also, using an applet written for a malevolent purpose, it is possible to perform an operation of duplicating memory areas in the card and/or imperilling the correct functioning of the chip card. It then becomes possible to have access to confidential or unauthorized data stored in the system, such as the access code in the case of a bank card for example, or attacking the integrity of one or more applications present on the card. Finally, if the card is connected to the outside world, the malfunctionings caused can be propagated outside the card.

Thus solutions have been proposed to remedy the security problems involved in the operation of downloading an intermediate code (bytecode) onto an on-board computer system provided with an intermediate-code interpreter, such as the aforementioned example of the JavaCard.

One solution consists of carrying out dynamic access and typing checks during the execution of the applets. The virtual machine then carries out a certain number of checks during the execution of the applets, such as:

Control of access to the memory: at each reading or writing in a memory area, the virtual machine checks the right of access of the applet to the corresponding data;

Dynamic verification of the data types: at each instruction from the applet, the virtual machine verifies that the constraints on the data types are satisfied;

Detection of stack overflows and illegal accesses to the execution stack of the virtual machine.

This solution does however have the drawback of a very significant slowing down in execution, caused by all the dynamic checks. Such checks also increase the requirements in terms of random access and permanent memory of the system, because of the additional information of the type that it is necessary to associate with the data being manipulated.

Another solution then consists of specifying the intermediate code (bytecode) so that it is possible to check that the program is inoffensive statically (that is to say during the downloading operation and before its execution). This is performed by a security device called a verifier. For security reasons, JavaCard cards must therefore possess an on-board verifier.

Although it allows an execution of the intermediate code that is much more rapid compared with the dynamic verification process, such a static verification process does however have the drawback of being expensive, both in terms of code size necessary for conducting this process and in terms of random access memory size necessary for containing the intermediate results of the verification, and in terms of calculation time.

Starting from the principle stated in the latter solution, patent application FR 2 797 963 (D1) presents a protocol for managing a downloaded intermediate code associated with a process of static verification of this intermediate code during its downloading, which allows secure execution of the latter by the on-board computer system. In this way advantageously a verifier is obtained that is much simpler and much less expensive in terms of code size necessary.

The central idea of D1 is to convert the intermediate code off card before it is downloaded in order to simplify its verification once it has been downloaded and stored in the card. A phase of transformation of the intermediate code is therefore carried out off card and it is a case consequently of a modified standardized intermediate code that is downloaded into the card, rather than the original intermediate code obtained by the use of a Java compiler. Thus the intermediate code transformed off card will be more easily verified in static mode according to a predefined verification process since it will have been transformed into a standardized intermediate code a priori satisfying the verification criteria of the predefined verification process that is the object of D1. This prior transformation phase carried out off card therefore advantageously accelerates the verification process. For a detailed description of this solution, reference can be made to the text of D1.

However, one drawback of the method proposed in D1 is that it does not make it possible to make the verification process of the intermediate code on which it is based cohabit with a signature system of this intermediate code. Thus D1 does not make it possible to have an intermediate code that it is firstly verifiable in a simple and rapid fashion and secondly signed. This is because the method proposed by D1 makes provision for transforming the intermediate code off card before it is downloaded as explained above and consequently the signature of the developer of the code (or of any other person authorized to sign the code) effected before the transformation imposed off card on the intermediate code becomes, because of the very fact of this modification, invalid. As a result the signature is then no longer verifiable by the card.

However, the possibility left for the card to be able to verify the signature of the downloaded intermediate code is also very important in terms of security. This is because the prior verification of the intermediate code before it is executed does not make it possible to ensure that the intermediate code does not contain any "Trojan horse". This is because only a manual analysis makes it possible to check that an intermediate code, even if it is correct vis-à-vis the verification, is not aggressive and this check cannot be carried out by the card. More precisely, the card can in fact only verify the validity of a signature attesting that this manual check on the intermediate code was carried out correctly. Hence the importance of being able to implement the downloading of an intermediate code having a valid signature.

The aim of the present invention, which is based on these various findings, is to mitigate the aforementioned drawbacks related to the use of the verification method that is the object of D1.

With this objective in view, the invention aims more particularly to make a signature system cohabit with the verification system proposed by D1 during the downloading of an intermediate code into a reprogrammable on-board computer system provided with an intermediate-code interpreter, without however dispensing with the advantages procured by the verification system according to D1, in particular in terms of simplicity and speed.

More generally, one object of the invention is the use of a method of managing an executable code to be downloaded, intermediate or not, allowing the verification of a signature of this code by an on-board computer system such as a microprocessor card, while leaving the opportunity to effect a transformation of the executable code with a view to a predefined specific use. For example, the transformation of the original executable code may wish to aim at improving its verification at the time of its downloading according to the principles of the verification process set out in D1, when it is a case of an intermediate code executed by means of a virtual machine, or improving its speed of execution by the microprocessor of the card, without such a transformation being able to impair the validity of the signature and therefore its verification by the card.

To this end, the invention therefore concerns a method of managing an original executable code forming a program intended to be downloaded into a reprogrammable on-board computer system such as a microprocessor card, the said code possessing a cryptographic signature and being executable by the microprocessor of the on-board system after verification by the latter of the validity of the said signature, the said method comprising the steps consisting of at least:

off card:—identifying a modified executable code corresponding to the original code, adapted to a predefined specific use;—from variations between the data of the original code and the corresponding modified code, calculating a software component which, when it is applied to the original code, makes it possible to reconstruct the modified code; and—signing the said software component;

downloading the signed original code and the signed software component into the card;

on card:—verifying the signatures respectively of the original code and of the software component;—applying the software component to the original code so as to reconstruct the modified code for its execution by the microprocessor.

In a variant, the original executable code consists of an intermediate code, executable by the on-board system microprocessor by means of a virtual machine making it possible to interpret this intermediate code.

According to a first embodiment, in relation to the said variant, the virtual machine is provided with an execution stack and the downloaded software component, applied on card to the original intermediate code, makes it possible to reconstruct a modified intermediate code a priori satisfying criteria of verification of the said intermediate code according to which the operands of each instruction of the said code belong to the types of data manipulated by this instruction and, at each target switching instruction, the execution stack of the virtual machine is empty.

Preferably, the modified intermediate code obtained by applying the software component is verified, before it is executed by the microprocessor by means of the virtual machine, according to a process verifying that the modified intermediate code satisfies the verification criteria.

According to another embodiment, the downloaded software component, applied on card to the original code, makes it possible to reconstruct a modified code such that its execution is more rapid with respect to that of the original code.

According to another embodiment, the downloaded software component, applied on card to the original code, makes it possible to reconstruct a modified code such that it procures an optimization in terms of size compared with the original code.

BRIEF DESCRIPTION OF THE DRAWINGS

Other characteristics and advantages of the invention will emerge more clearly from the description given below, by way of indication and in no way limitingly, with reference to the following figures, in which.

DETAILED DESCRIPTION

Figure 1:
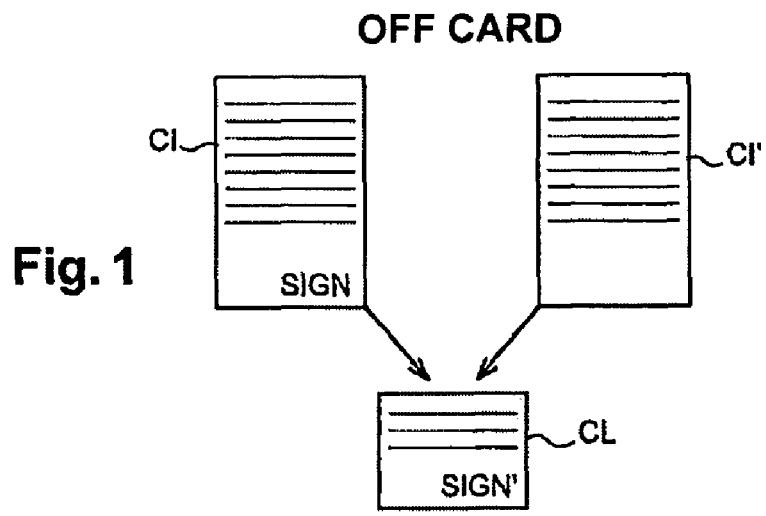
FIG. 1 illustrates schematically the steps of the method performed off card.
Figure 2:
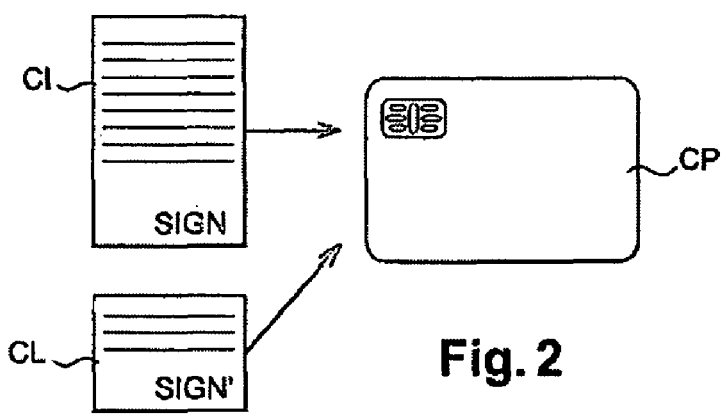
FIG. 2 illustrates schematically the step of downloading into the card the original intermediate code and the associated software component dedicated to a predefined specific use.

The description that will follow is more particularly oriented towards an application of the invention in an open system context, and more particularly that of reprogrammable microprocessor cards of the JavaCard CP type as depicted in FIG. 2, where the downloaded original code is an intermediate code executed by the microprocessor by means of a virtual machine. However, the fact must not be lost from view that the method according to the invention also applies to a context where the downloaded card is not an intermediate code but a code directly executable by the microprocessor of the on-board system.

Such reprogrammable systems therefore add the possibility of enhancing the executable program after the system is brought into service by an operation of downloading an applet. The applet that is to be downloaded is in the form of an original executable code CI, consisting in this example of an intermediate code for a virtual machine, typically a subassembly of the Java virtual machine resident in the memory of the card. Thus, once the intermediate code CI has been generated, an auditor is brought into play in order to verify that the intermediate code CI does not contain a Trojan horse.

Where the intermediate code CI does not actually contain any malicious program of this type, the auditor signs the intermediate code CI. The cryptographic signature SIGN can be made using any electronic signature mechanism available to persons skilled in the art. The intermediate code CI signed can then be used on any JavaCard and therefore possesses a signature SIGN attesting to its innocuousness and able to be verified by the card at the time of its downloading. The verification of the electronic signature consists of verifying that the signature is valid.

One essential characteristic of the invention consists of downloading the original intermediate code CI, that is to say not modified, into the card CP and adding to it a software component CL making it possible, when it is applied to the original intermediate code, to calculate a modified intermediate code CI' adapted to a predefined specific use. In the figures the original intermediate code CI is shown diagrammatically by code lines in continuous lines, whilst the corresponding modified intermediate code CI' is shown diagrammatically by code lines in continuous lines and dotted lines.

According to the invention, the supplementary software CL to be applied to the signed original intermediate code CI is calculated off the card according to the original intermediate code CI and the corresponding modified intermediate code, identified for a predefined specific use. In the same way as for the original intermediate code CI, the software component CL is signed and therefore has a signature SIGN' able to be verified.

The main application of the invention is to be able to make a signature system cohabit with the verification system proposed by D1 during the downloading of the intermediate code into the card. Thus, in the context of this application, the intermediate code CI' is a modified intermediate code adapted to the predefined specific use consisting of a priori satisfying the verification criteria for the verification process that is the object of D1. Thus, in the main application of the invention, the software component is calculated so that, once applied to the original intermediate code CI, a modified intermediate code CI' is obtained that is standardized according to the teaching of D1 so as to a priori satisfy the verification criteria of the verification process that is the object of D1. In particular, the standardized intermediate code according to D1 is such that the operands of each instruction belong to the types of data manipulated by this instruction and the execution stack of the virtual machine is empty at each target switching instruction. For a more detailed description, the reader can usefully refer to the text of D1. However, it would be departing from the scope of the present application to detail here the calculations making it possible to end up with the software component as defined, which are more known to persons skilled in the art.

The original intermediate code CI and the associated component CL are then downloaded into the card CP, see FIG. 2. The software component CL therefore travels with the original intermediate code CI and is intended to be applied on card to the original intermediate code, once stored with the latter in a rewriteable permanent memory of the card.

The card first of all verifies that the signature SIGN of the intermediate code CI is valid, so as to ensure that the latter does not include any Trojan horse nor any other malicious code of the same type. The card also verifies the validity of the signature SIGN' of the software component CL in order to ensure that it too does not contain a Trojan horse.

Figure 3:
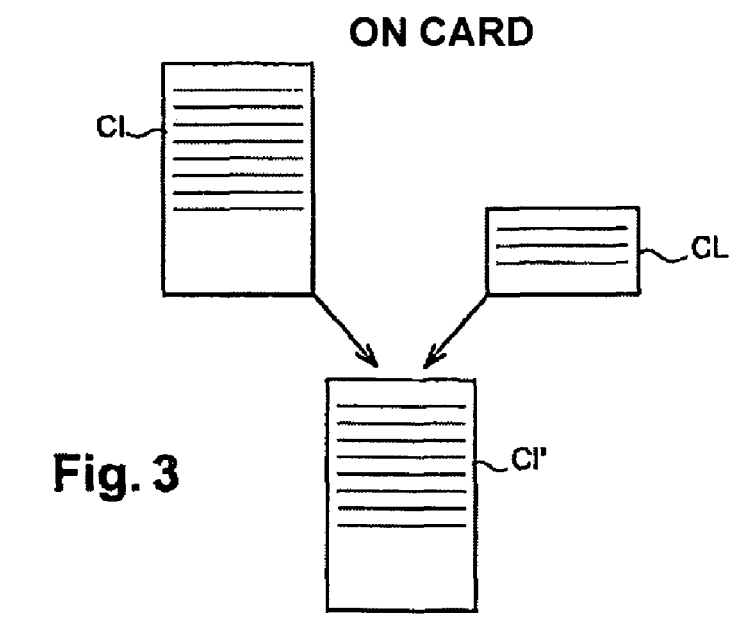
FIG. 3 illustrates schematically the steps of the method performed on card.

Once these prior signature verification operations have been successfully performed, the card applies the software component CL to the original intermediate code CI, see FIG. 3, so as to reconstruct the modified code CI' adapted to the predefined specific use consisting, in the main embodiment of the invention, of a priori satisfying the verification criteria of the verification process that is the object of D1.

The card can then verify the modified intermediate code before it is executed by the microprocessor by means of the virtual machine using the verification techniques employed in the static verification process of a fragment of program that is the object of D1. Thus the verification process consists of verifying that the modified intermediate code CI' satisfies the aforementioned verification criteria, namely that the operands of each instruction of the modified code belong to the types of data manipulated by this instruction and, at each target switching instruction, the execution stack of the virtual machine is empty. The reader is requested to refer to the text of D1 for more details, which would be superfluous in the context of the present application.

Then, once the verification of the modified intermediate code has been conducted according to the principles of the verifier that is the object of D1, the modified intermediate code is executed by the microprocessor by means of the virtual machine.

Thus the method according to the invention makes it possible to make a signature system cohabit advantageously with the verification system proposed by D1 during the downloading of an intermediate code into a reprogrammable on-board computer system. It is therefore possible to download signed applets into the card and to enable the card to verify this signature whilst resulting in a verification process as disclosed in D1. This is made possible by virtue of the software component to be downloaded at the same time as the signed original intermediate code, which makes it possible, when it is applied on card to the latter, to obtain a modified intermediate code complying with the principles of the simple fast verifier disclosed in D1.

The intermediate code downloaded into the card according to the invention being the original intermediate code, its signature is not made invalid by any modification process effected off card and, consequently, the card is in a position to verify its signature before its execution.

However, though the main application that is being presented concerning a software component adapted for the purpose of verification of the intermediate code according to the principles disclosed in D1, the invention is in no way limited to such an application.

In general, the invention applies to the downloading into a reprogrammable on-board system of an original executable code, intermediate or not according to the system, and of an associated software component such that, when it is applied on card to the original code, the software component makes it possible to reconstruct a modified code adapted for a predefined specific use. The purpose can therefore be other than the obtaining of a modified code permitting the application of the verification process according to D1.

In particular, the predefined specific use to which the modified code responds can correspond to an optimization in terms of time of the execution of the code. Thus the software component downloaded with the original code can be calculated so that the original code, once modified on card by application of the component, is executed more rapidly. In this application of the invention, the downloaded software component applied on card to the original code therefore makes it possible to reconstruct a modified code such that its execution is more rapid compared with that of the original code.

Equally, the software component downloaded with the original code can be calculated so that the original code, once modified on card by application of the component, occupies less memory space. In this application of the invention, the downloaded software component, applied on card to the original code, therefore makes it possible to reconstruct a modified code such that it procures an optimization in terms of size compared with the original code.

The example given below by way of illustration concerns a concrete case of application on card of a software component to an original intermediate code with a view to obtaining an optimization in terms of speed of execution and size of the downloaded original code. In this example, the downloaded original intermediate code describes a normal operation performed in the chip card programs consisting of recovering the least significant byte of a 16-bit word placed on the stack.

Let therefore the following original intermediate code (symbolic notation and Java operation code) be:

0x11 sspush 255
0x00
0xFF
0x53 sand ;

This code makes it possible to recover the least significant byte of a 16-bit word placed on the stack. For this, it is necessary to stack a 16-bit word whose most significant byte is at 0x00 and whose least significant byte is at 0xFF (sspush 255), and then do a logic AND between the two 16-bit words on the stack (sand).

And let the corresponding replacement code be:

0xC9 Xsand_255 ;

In this particular example, the function of the downloaded software component intended to be applied on card to the original intermediate code is to replace the series of instructions 0x11, 0x00, 0xFF, 0x53 with the replacement code 0xC9, in order thus to obtain a modified intermediate code for performing the same operation but procuring a saving of 6 bytes compared with the original intermediate code and therefore an optimization in terms of size and speed when it is executed by the microprocessor by means of the virtual machine.

Other applications can of course be envisaged without for all that departing from the scope of the present invention.

The invention claimed is:

1. A method of managing an original executable code forming a program to be downloaded into a reprogrammable on-board computer system in a microprocessor card, said code possessing a cryptographic signature and being executable by the microprocessor of the on-board system after verification by the latter of the validity of said signature, said method comprising the following steps:
   off card:
      identifying a modified executable code that is adapted to a predefined specific use, and corresponds to the original code, and
      calculating a software component according to the original intermediate code and the corresponding modified intermediate code identified for the predefined specific use, the software component, when applied to the original code, making it possible to produce the modified code;
   signing said software component;
   downloading the signed original code and the signed software component into the card; and
   on card:
      verifying the signatures respectively of the original code and of the software component, and
      applying the software component to the original code so as to produce the modified intermediate code for execution by the microprocessor.

2. A method according to claim 1, wherein the original executable code consists of an intermediate code, executable by the on-board system microprocessor by means of a virtual machine for interpreting this intermediate code.

3. A method according to claim 2, wherein the virtual machine is provided with an execution stack and wherein the downloaded software component, which is applied on card to the original intermediate code, makes it possible to produce a modified intermediate code a priori satisfying the verification criteria for said intermediate code according to which the operands of each instruction of said code belong to the data types manipulated by this instruction and, on each target switching instruction, the execution stack of the virtual machine is empty.

4. A method according to claim 3, wherein the modified intermediate code obtained by the application of the software component is verified, before the execution by the microprocessor by means of the virtual machine, according to a process verifying that the modified intermediate code satisfies the verification criteria.

5. A method according to claim 1, wherein the downloaded software component, applied on card to the original code, makes it possible to produce a modified code so that execution of the modified code is more rapid compared with that of the original code.

6. A method according to claim 1, wherein the downloaded software component, applied on card to the original code, makes it possible to produce a modified code so that it procures an optimization in terms of size compared with the original code.

* * * * *